(12) United States Patent
Durand

(10) Patent No.: US 6,860,013 B1
(45) Date of Patent: Mar. 1, 2005

(54) METHOD FOR JOINING SUSPENSION COMPONENTS

(75) Inventor: Robert D. Durand, Wyomissing, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/319,690

(22) Filed: Dec. 16, 2002

(51) Int. Cl.⁷ ................................................. B23P 15/12
(52) U.S. Cl. ......................... 29/897.2; 29/508; 29/520; 29/518; 219/611; 219/617
(58) Field of Search ................... 29/892.2, 897, 29/506, 518, 516, 520, 419.2, 505, 525.13, 450, 525.14, 511; 180/311; 280/781, 797, 798; 219/603, 617, 611; 72/56; 403/1, 71, 192

(56) References Cited

U.S. PATENT DOCUMENTS

| | | | |
|---|---|---|---|
| 3,436,806 A | | 4/1969 | Supan |
| 3,520,049 A | | 7/1970 | Lysenko et al. |
| 4,067,216 A | | 1/1978 | Khimenko et al. |
| 4,150,274 A | * | 4/1979 | Minin et al. ................ 219/610 |
| 4,504,714 A | | 3/1985 | Katzenstein |
| 4,513,488 A | | 4/1985 | Arena |
| 4,807,351 A | | 2/1989 | Berg et al. |
| 5,800,024 A | | 9/1998 | Steimmel et al. |
| 5,803,128 A | * | 9/1998 | Reed .............................. 138/123 |
| 5,966,813 A | * | 10/1999 | Durand ....................... 29/897.2 |
| 5,981,921 A | | 11/1999 | Yablochnikov |
| 6,086,162 A | * | 7/2000 | Pinch et al. .............. 301/124.1 |
| 6,255,631 B1 | * | 7/2001 | Kichline et al. ............. 219/617 |
| 6,389,697 B1 | * | 5/2002 | Benoit et al. ............... 29/897.2 |
| 2003/0214155 A1 | * | 11/2003 | Kiehl et al. .................. 296/204 |

* cited by examiner

Primary Examiner—David P. Bryant
Assistant Examiner—Stephen Kenny
(74) Attorney, Agent, or Firm—Liniak, Berenato & White

(57) ABSTRACT

A method of joining two vehicle suspension components made from the same or dissimilar materials includes providing a first suspension component, and providing a second suspension component made from a material which is same/dissimilar to the material used to make the first suspension component, where one of the first and second suspension components is a metallic component made of a metallic material. A portion of one of the first and second suspension components is positioned within a portion of the other of the suspension components in an overlapping manner, thereby forming an overlapping portion. A metallic band may be disposed around the overlapping portion. An inductor is positioned around the overlapping portion. The inductor is energized to generate a magnetic field for collapsing at least one of the overlapping portion and the metallic band at a velocity sufficient to magnetic pulse weld the components to each other, thereby securing the first and second suspension components together.

14 Claims, 4 Drawing Sheets

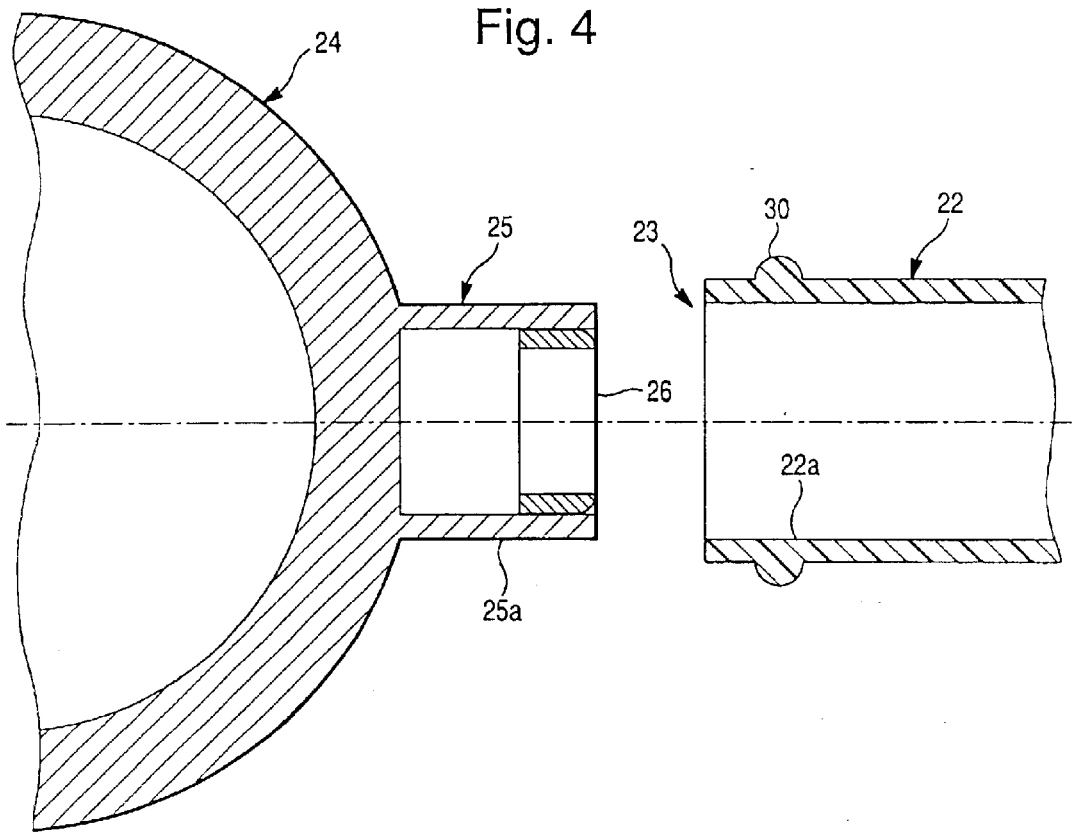
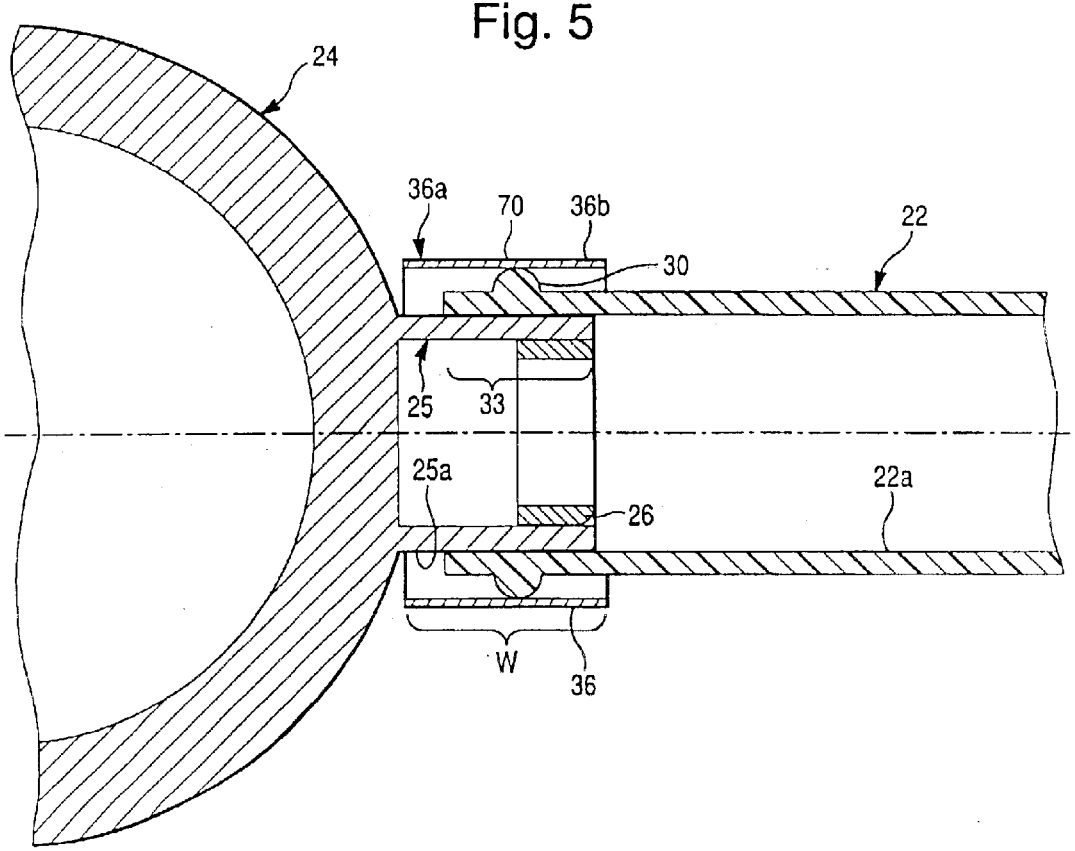

METHOD FOR JOINING SUSPENSION COMPONENTS

BACKGROUND OF THE INVENTION

1. Field of the Invention

This invention relates in general to vehicular suspension assemblies and in particular to a method for joining together suspension components, especially those manufactured from dissimilar materials, to form such a vehicle suspension assembly.

2. Background of the Invention

Suspension assemblies are well known structures that come in a variety of designs depending on the type of vehicle. Conventional suspension assemblies include first and second body components that are movable relative to one another and linked together to accommodate relative movement. A typical link includes first and second end portions that are adapted to respectively engage the first and second body components of the vehicle. The first and second rotatable end portions are connected together by an elongated center shaft portion.

Traditionally, the various portions of the suspension link have been manufactured from a single material, such as steel. The prior manufacturing techniques for suspension components are limiting with respect to the material forming the suspension members; thus, the convention links are restrictive with respect to weight and strength. The need exists for a method of manufacturing various portions of the suspension link from differing materials to reduce overall weight and cost without sacrificing durability and performance.

SUMMARY OF THE INVENTION

The following objects as well as other objects not specifically enumerated are achieved by a method of joining suspension components made from dissimilar materials, where the method includes providing a pair of end portions and a central shaft portion made from dissimilar materials. The end portions are joined to the central shaft portion using magnetic pulse welding techniques; therefore, the instant invention provides suspension components having reduced weight without sacrificing durability and strength of the components.

For example, where two generally conductive metallic components of similar or dissimilar material constitute at least a part of the suspension component, a portion of one of the suspension components may be positioned within a portion of the other of the components in an overlapping manner, thereby forming an overlapping portion. An inductor is positioned around the overlapping portion. The inductor is energized to generate a magnetic field for collapsing the outer and overlapping portion at a velocity sufficiently developed by an electromagnetic pulse to weld the outer and inner metallic components to each other, thereby securing the suspension components together.

In another embodiment of the invention, the method of joining two suspension components made from dissimilar materials where the outer member is both dissimilar and less or non-conductive, the process includes the steps of providing a first suspension component of a metallic material, providing a second suspension component made from a composite or non-conductive dissimilar material, the second suspension component having a protrusion or locking feature, and positioning a portion of the first suspension component within a portion of the second suspension component in an overlapping manner, thereby forming an overlapping portion, where the protrusion is within the overlapping portion. A conductive metallic band is disposed around the overlapping portion, and an inductor is disposed around the metallic band.

The inductor is energized to generate a magnetic field for collapsing the band about the overlapping portion at a velocity sufficiently developed by an electro-magnetic pulse to weld the outer band and inner metallic component to each other, thereby securing the first and second suspension components together, wherein the metallic band is also crimped over the protrusion securing the composite or non-conductive component to the inner metallic housing.

From the foregoing, it is clear that various parts of the suspension link can be selected based on weight while other parts of the suspension link can be selected based on strength.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 4 through 7 are enlarged cross-sectional views in elevation of a portion of the vehicle suspension component sequentially illustrating the steps in the second alternate method for securing suspension components in accordance with this invention.

DETAILED DESCRIPTION OF THE PREFERRED EMBODIMENT

Figure 1:
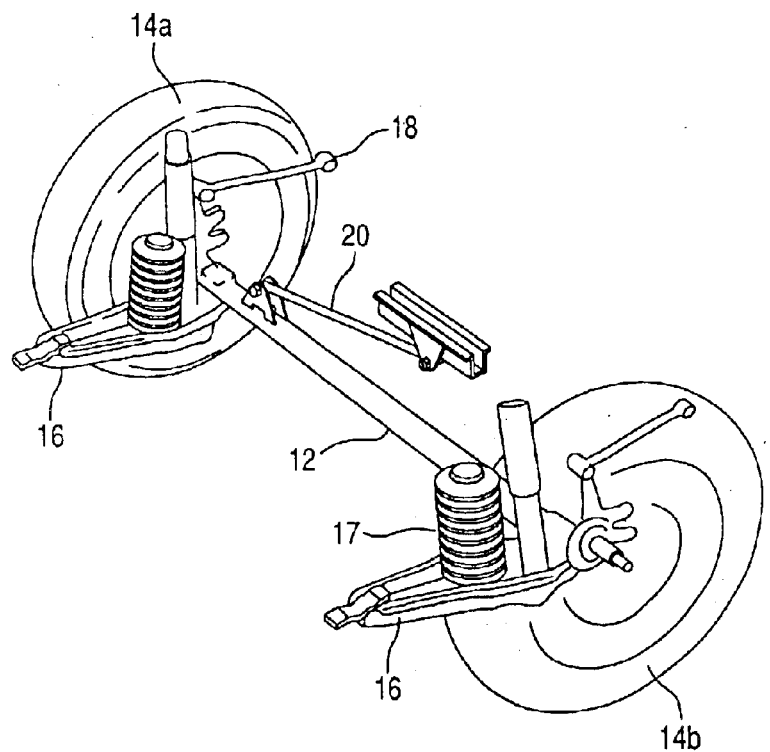
FIG. 1 is a schematic perspective view of a conventional vehicle suspension.
Figure 1A:
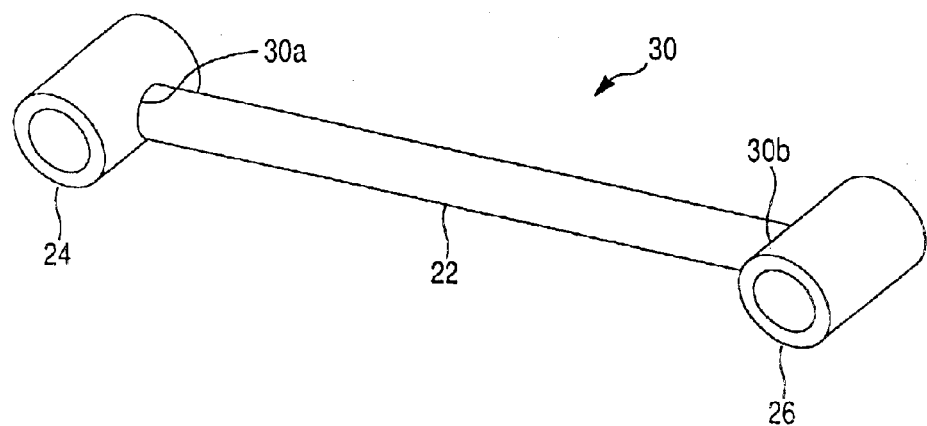
FIG. 1a is a schematic perspective view of one type of suspension link described with respect to the method of this invention.

Referring now to the drawings, there is schematically illustrated in FIG. 1 a vehicle suspension assembly for a solid axle 12 that does not drive the wheels 14a, 14b whereby suspension components cross bar or link 20 to be manufactured in accordance with the method of this invention. The illustrated vehicle suspension assembly is one type of dead axle assembly with trailing arms 16, coil springs 17 and rear links 18; however, it will be appreciated that the method of this invention may be utilized in the manufacture of any type of vehicle suspension assembly where the structural components include at least one link as part of a suspension assembly.

By way of example, the illustrated suspension assembly includes a cross bar or link 20 formed of a central shaft portion 22 and a pair of end portions 24, 26 in the form of rotary fittings. The central shaft portion 22 is adapted to provide a link between the two end portions 24, 26 that rotatably mate with first and second components of the vehicle. These components 22, 24, 26 can be formed having any desired structure taking into account the special features described below, as is well known to those skilled in the art and may be formed from any desired material. Preferably, the central shaft portion 22 is formed of aluminum to reduce the overall weight of the link 20 while the end portions 24, 26 may be steel or other material suitable to withstand the rigors and stress common to a vehicle suspension system. The end portions 24, 26 are typically made of steel, but this invention should not be limited in any way to a specific material for these components.

In a preferred embodiment of this invention, the suspension members to be joined are both made from different metallic materials. For example, the center shaft portion 22 can be formed from aluminum or other material of relatively light weight compared to steel, and the end portions 24, 26 can be formed from steel or comparable material. It is also envision that one of the two vehicle suspension components, for example one of the shaft portion or the end portions to be joined together at a joint is made from a non-metallic material, while the other component is made from a metallic material. Thus, the illustrated joints 30a, 30b connect a metallic end component 24, 26 to a non-metallic shaft component 22. However, the method of this invention is equally suitable to form a joint 30a, 30b between two axle components made from any two dissimilar materials, even where the two dissimilar materials are generally not joinable by conventional techniques. As such, the inventive method may be used to join two axle components made from dissimilar metals or to join two axle components made from one metallic material and another, different non-metallic (or non-weldable) material.

Figure 2:
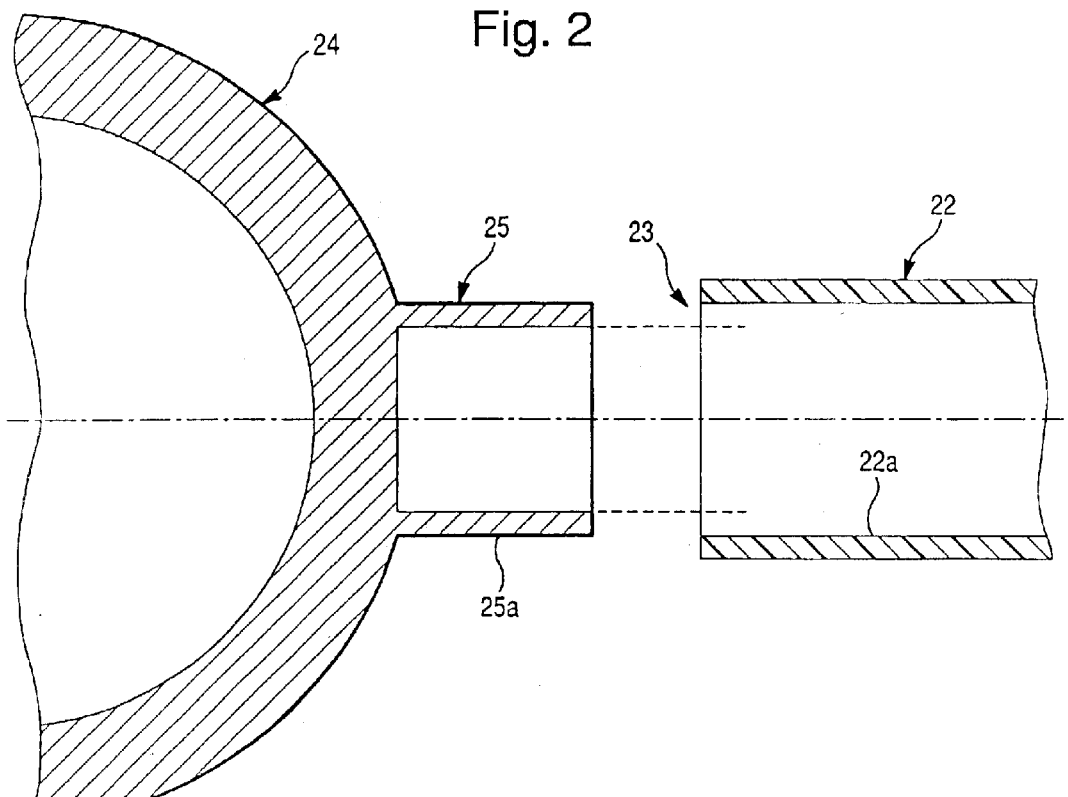
FIGS. 2 and 3 are enlarged cross-sectional views in elevation of a portion of the vehicle suspension component sequentially illustrating the steps in the first preferred method for securing suspension components in accordance with this invention.
Figure 3:
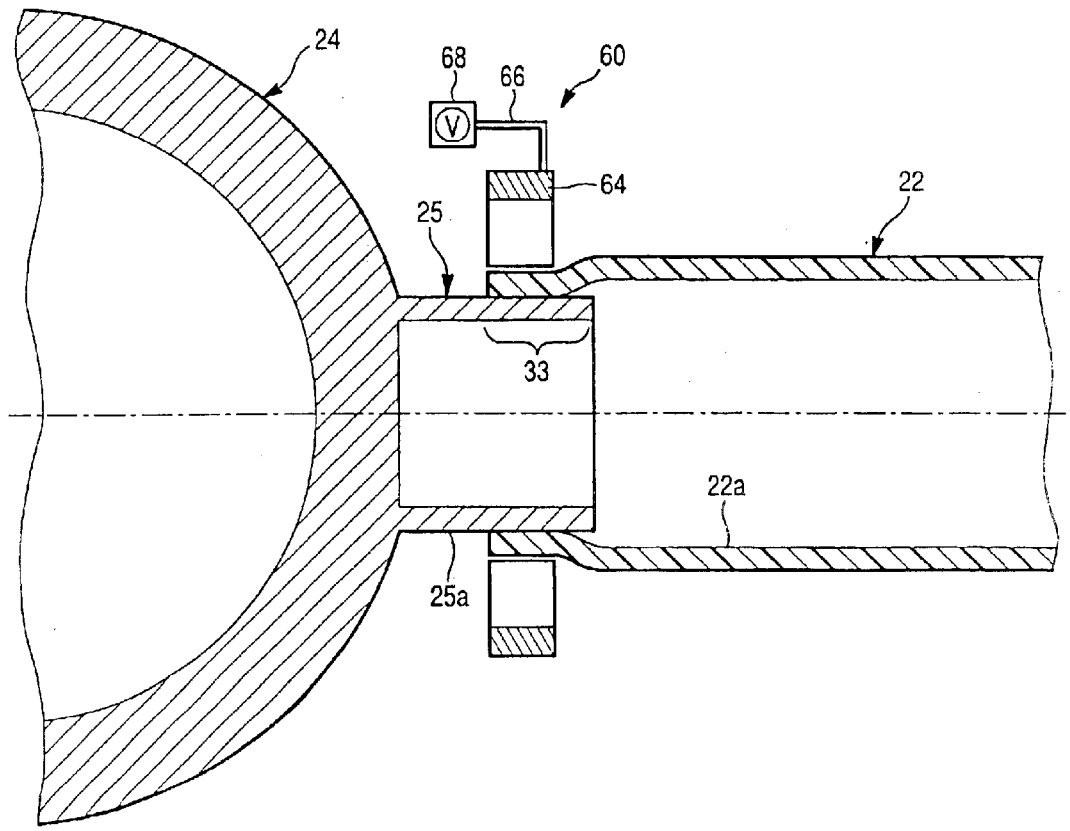

The method for joining two vehicle axle components made from dissimilar materials in accordance with this invention is shown in FIGS. 2 through 7. A first exemplary method is illustrated in FIGS. 2 and 3, and a second exemplary method is shown in FIGS. 4–7.

In a first step of the method shown in FIG. 2, a metallic end portion 24 defining a rotary fitting and a non-metallic shaft portion 22 are provided. In the illustrated embodiment, both the end portion 24 and the shaft portion 22 are shown as closed channel structures, although such is not required. Metallic materials suitable for use in a vehicle suspension assemblies include, but are not limited to, steel, aluminum, magnesium, and alloys thereof. Non-metallic material suitable for use in a vehicle suspension component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The end portion 24 includes a flange 25 or other portion which extends from the end portion 24 at a location where it is desired to attach the shaft portion 22. The flange 25 is adapted to be received within a portion of the arm portion, such as open end 23. The cross sectional shape of the flange 25 should be compatible with the cross sectional shape of the shaft portion 22 of sufficient geometry to permit a magnetic pulse weld in the configuration where generally conductive materials are involved. Further, when the material of the outer component is composite, the perimeter of the outer surface 25a of the flange 25 will be only slightly smaller than the perimeter of the inner surface 22a of the arm portion 22 so that the cross member composite material will be supported on the flange 25 of end portion 24 during and after the magnetic pulse welding. In a preferred embodiment, both the flange 25 and the shaft portion 22 have a generally tubular rectangular or otherwise continuous cross section.

The second step in the method of this invention, as illustrated in FIG. 3, is to position the open end 23 of the shaft portion 22 on the flange 22 such that a portion of the inner surface 22a of the shaft portion 22 overlaps and contacts a portion of the outer surface 25a of the flange 25. The overlapping portion is indicated at 33.

The third step in the method of this invention is illustrated in FIG. 3. As shown, a perimeter reduction device, such as magnetic pulse welding apparatus indicated generally at 60, is disposed around and adjacent the overlapping portion 33 of the shaft portion 22 and flange 25. The magnetic pulse welding apparatus 60 includes leads or terminals 66 that connect a source of power 68 to the inductor coil 64. The electromagnetic pulse apparatus 60 is adapted to generate an intense, momentary magnetic field on a localized portion of the overlapping portion 33. The intense magnetic field applied at a localized area creates inwardly directed forces which cause the shaft portion 22 to collapse inwardly at that area, thereby reducing its size until it intimately contacts the flange 25 and is magnetically pulse welded to the flange 25. The contact of the two members at high velocities from appropriately defined initial geometry causes the two members to be welded together.

An alternate method of pulse welding the axle components is shown in FIGS. 4–7. In a first step of the method shown in FIG. 4, a metallic end member 24 and a non-metallic shaft portion 22 are provided. In the illustrated embodiment, both the end member 24 and the shaft portion 22 are shown as closed channel structures, although such is not required. Metallic materials suitable for use in a vehicle axle assembly include, but are not limited to, steel, aluminum, magnesium, and alloys thereof. Non-metallic material suitable for use in a vehicle axle component include, but are not limited to plastics, layered composites, fiber matrix composites (such as an arimid/glass/carbon composite), or combinations thereof. Other non-metallic materials include reinforced inorganic composite materials and laminate materials. For purposes of this invention, all of these non-metallic materials are referred to as "composite materials".

The end portion 24 includes a flange 25 or other portion which extends from the end portion 24 at a location where it is desired to attach the shaft portion 22. In some light axle applications (i.e., gauge of material is less than 2.5 mm), an insert 26 might be used to provide the rigidity and stiffness necessary for a successful magnetic pulse welding process. The insert 26, if required, must be intimate with the outer supported component but does not have to be welded. The flange 25 is adapted to be received within a portion of the shaft portion 22, such as open end 23. The cross sectional shape of the flange 25 should be compatible with the cross sectional shape of the shaft portion 22 of sufficient geometry to permit a magnetic pulse weld in the configuration where generally conductive materials are involved. Further, when the material of the outer component is composite, the perimeter of the outer surface 25a of the flange 25 will be only slightly smaller than the perimeter of the inner surface 22a of the arm portion 22 so that the cross member composite material will be supported on the flange 25 of end portion 24 during and after the magnetic pulse welding. In a preferred embodiment, both the flange 25 and the shaft portion 22 have a generally tubular rectangular or otherwise continuous cross section.

In the illustrated second embodiment, the shaft portion 22 includes a protrusion 30 disposed on its outer surface. As shown therein, the protrusion 30 has a generally, semi-circular cross section, although this is not required. The protrusion 30 may extend around the entire perimeter of the outer surface of the shaft portion 22, or only a portion thereof. In addition, one or more rows of protrusions 30 may be positioned on the outer surface of the shaft portion 22 along its axial length.

The second step in the method of this invention, as illustrated in FIG. 5, is to position the open end 23 of the shaft portion 22 on the flange 25 such that a portion of the inner surface 22*a* of the shaft portion 22 overlaps and contacts a portion of the outer surface 25*a* of the flange 25. The overlapping portion is indicated at 33. Next a metallic band 36 is disposed completely around the overlapping portions of the shaft portion 22 and the flange 25. The metallic band 36 is a continuous, annular-shaped member of good electrically conductive material, such as but not restricted to aluminum. The metallic band 36 has a width W sufficient to extend across the width of the protrusion 30 and the overlapping portion sufficient to be welded to flange 25. The band is provided with two edge portions 36*a*, 36*b* that are aligned on either sides of the protrusion. The edge portions are adapted to contact the flange 25 and the shaft portion 22, respectively, when formed radially inwardly by magnetic pulse applied to the band 36. It should be noted that the protrusion 30 is provided on the outermost of the two axle housing components, i.e. the axle housing component which is disposed around or outside the other axle housing component. Thus, if the shaft portion 22 is disposed around a portion of the end member flange 25, then the arm portion is the outermost axle housing component, and the protrusion 30 is formed on the outer surface of the shaft portion 22.

Figure 6:
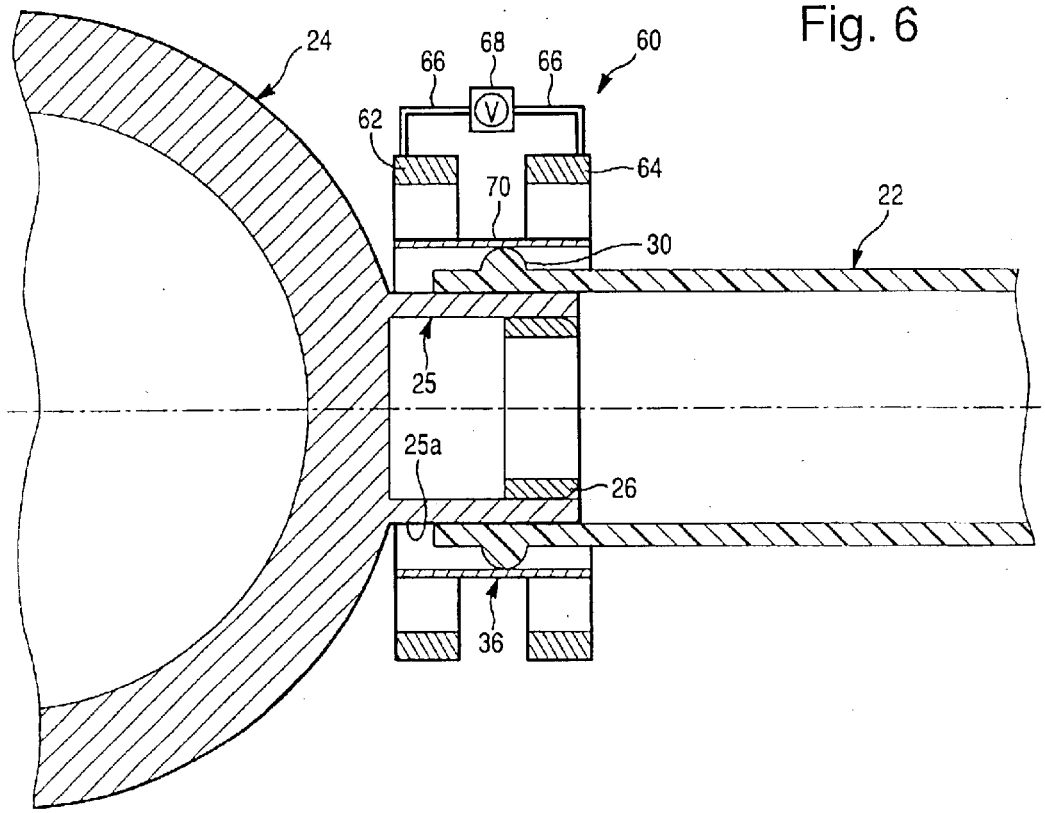
Figure 7:
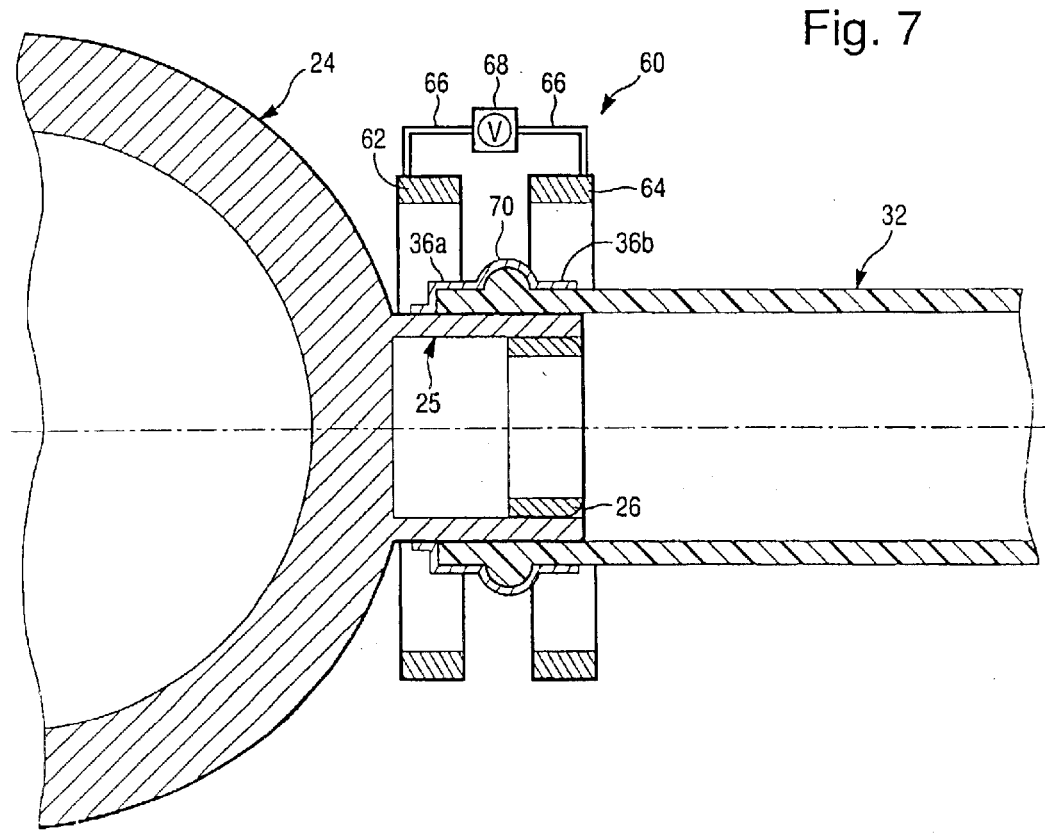

The third step in the method of this invention is illustrated in FIGS. 6 and 7. As shown, a band perimeter reduction device, such as magnetic pulse welding apparatus indicated generally at 60, is disposed around the metallic band 36 and around and adjacent the overlapping portion 33 of the shaft portion 22 and flange 25. The electromagnetic pulse apparatus 60 is adapted to generate an intense, momentary magnetic field on a localized portion of the metallic band 36. The intense magnetic field applied at a localized area creates inwardly directed forces which cause the metallic band 36 to collapse inwardly at that area, thereby reducing its size until it intimately contacts the shaft portion 22 and is magnetically pulse welded to the flange 25. The contact of the two metallic members at high velocities from appropriately defined initial geometry causes the two metallic members to be welded together.

In the illustrated embodiment, the magnetic pulse welding apparatus 60 includes one or more inductor coils at 62 and 64. The inductor coil of apparatus 60 may involve a single turn, an opening coil comprised of a plurality of circular elements or a coil comprised of a plurality of non-opening elements (not shown) similar to that disclosed in U.S. Pat. No. 4,129,846 to Yablochnikov, which is hereby incorporated by reference. The preferred opening coil provides greater ease of manufacturing in the total assembly of the axle housing.

The magnetic pulse welding apparatus 60 includes leads or terminals 66 that connect a source of power 68 to the inductor coils at 62 and 64. The magnetic pulse welding apparatus 60 includes one or more high voltage capacitors (not shown) and a discharge circuit (not shown) that is suitable for conducting a momentary current of sufficient magnitude. The central components of an magnetic pulse welding apparatus are its capacitor bank, inductor and high current switching device. The current required to successfully deform and weld on a hollow metallic member used in a vehicle axle component, such as the band 36, may exceed one million amps, and will vary with the charge voltage of the power supply of 60, materials selected for components of the axle assembly and band 36 and gauge thickness. The discharge circuit and the capacitors operate to supply an energy spike or surge to the inductor coils 62 and 64. The inductor coils 62 and 64 create a strong magnetic field that exerts a force against the outer surface of the band 36. The effect of the intense, momentary magnetic field on the metallic band 36 is to create an extremely powerful force that repels or drives band 36 radially inwardly away from the inductor coils 62 and 64. The magnetic field created by the pulse of current through the inductor coil 62 and 64 creates strong reactive eddy currents in the metallic band 36. The eddy currents create opposing magnetic fields that result in inwardly directed forces on the metallic band 36. These forces cause the band 36 to collapse about a localized area, reducing its size until it contacts the flange 25, the protrusion 30, and the shaft portion 22, thereby welding and also crimping or clinching the band 36.

The amount that the metallic band 36 is reduced in size is determined by the shape of the inductor coils 62 and 64, the developed geometry of the band 36 relative to flange 25 and shaft portion 22 and the strength of the electromagnetic field. These factors affect the velocity of the metallic band as it is reduced in size. In the illustrated embodiment, the coil 62 disposed around the portion of the metallic band 36 located above the flange 25 is preferably adapted to both reduce the size of the band 36 until it contacts the metal flange 25 and to weld the band 36 to the flange 25. In contrast, the coil 64 disposed around the portion of the metallic band 36 located above the non-metallic shaft portion 22 is preferably adapted to only reduce the size of the band until it contacts the shaft portion 22, thereby crimping or clinching the metallic band around the protrusion 30. As can be seen in FIG. 7, one part of the band 36, i.e., edge portion 36*a*, is welded to the flange 25, whereas the other part of the band 36, the edge portion 36*b*, is attached to the shaft portion 22 by crimping or clinching the band around the protrusion 30.

In an alternative embodiment, a multi turn coil, not shown, is provided for the magnetic pulse welding step. This multi turn coil is adapted to provide electromagnetic fields of variable strengths across the width of the band 36. In this embodiment, the multi turn coil is used to discretely reduce or crimp the various portions of the metallic band, such as section 36*a* located adjacent the flange 25, central section 70 located above the protrusion 30, and section 36*b* located adjacent the shaft portion 22.

As shown in FIG. 7, the magnetic pulse welding apparatus 60 is operated so that the coils 62 and 64 each create an electromagnetic field which causes the metallic band 36 to be reduced in size around the flange 25, the protrusion 30, and the shaft portion 22. The coil 62 is operated such that the section of the metallic band 36 is also welded to the flange 25, thereby forming the joint 30*a* between the shaft portion 22 and the end portion 24. The reduction of the metallic band portions 36*a*, 36*b* on both sides of the protrusion 30 functions as a mechanical lock by crimping or clinching to also secure the shaft portion 22 to the flange 25. Although the protrusion 30 is shown as an arcuate surface, being somewhat less than a semicircle in cross-sectional profile, it is to be understood that the protrusion can be configured in numerous other shapes, as long as the protrusion can function as a mechanical lock by crimping or clinching to secure the shaft portion 22 to the flange 25. The protrusion 30 should have sufficient height and shape to act as an effective locking device for crimping. Preferably the protrusion 30 has a thickness within the range of from about 70 percent to about 150 percent of the thickness T of the cross member, although the protrusion can have other heights. It is to be understood that although the joint 30a, 30b is illustrated as being formed in part by mechanical crimping or clinching of the edge portion 36a of the band 36 to the shaft portion 22, the bond can be effected or enhanced by the use of adhesive, with or without the use of crimping or clinching.

The foregoing method and process has been shown and described with reference to the end portion 24 and the shaft portion 22; however, the same principles and process can be applied to both end portions 24, 26 as well as any type of suspension member having end rotary fitting or mounts and the intermediate shaft portion. Additionally, the process and associated structure related to the pulse weld method described above may be varied and adapted to suit the structure being joined. To that end, applicant hereby incorporates by reference to U.S. Pat. No. 5,966,813.

The principle and mode of operation of this invention have been described in its preferred embodiments. However, it should be noted that this invention may be practiced otherwise than as specifically illustrated and described without departing from its scope.

What is claimed is:

1. A method of joining vehicle suspension components made from similar and/or dissimilar materials, the method comprising the steps of:
   a. providing a first suspension component made of a first material, said first suspension component having an annular cross section defining a rotary axis running down the center of said annular cross section, the first suspension component having a flange defining a longitudinal axis extending in a direction perpendicular to said rotary axis;
   b. providing a second suspension component made from a second material, wherein at least one of the first and second suspension components is made from a metallic material;
   c. positioning said flange of the first suspension component within a portion of the second suspension component in an overlapping manner, thereby forming an overlapping portion;
   d. providing an inductor around the overlapping portion;
   e. energizing the inductor to generate a magnetic field and to magnetic pulse weld the metallic material, thereby securing the first and second suspension components together,
   wherein the first component is a rotary fitting for mounting to a vehicle frame and the second component is a shaft portion for providing a link between said vehicle frame and an additional part of said vehicle.

2. The method of claim 1, further comprising the steps of disposing a metallic band around the overlapping portion; providing said inductor around the metallic band; and energizing the inductor to generate a magnetic field for collapsing the metallic band about the overlapping portion and to magnetically pulse weld the metallic band to the overlapping portion, thereby securing the first and second suspension components together.

3. The method of claim 1, wherein both the first and second components are dissimilar metallic components.

4. The method of claim 1, wherein the rotary fitting is made of a metallic material and the shaft portion is made of a composite material.

5. The method of claim 4, wherein a section of the rotary fitting is positioned within a portion of the shaft portion to form the overlapping portion.

6. The method of claim 4, wherein the shaft portion is made of a metallic material and the rotary fitting is made of a composite material.

7. The method of claim 4, wherein a section of the shaft portion is positioned within a section of the rotary fitting to form the overlapping portion.

8. The method of claim 1, wherein an insert is positioned within the metallic component to provide support for the metallic component during the step of welding.

9. A method of joining two vehicle suspension components made from similar and/or dissimilar materials, the method comprising the steps of:
   a. providing a first suspension component made from a metallic material;
   b. providing a second suspension component made from a composite material, the second suspension component having a protrusion;
   c. positioning a portion of the first suspension component within a portion of the second suspension component in an overlapping manner, thereby forming an overlapping portion, wherein the protrusion is within the overlapping portion;
   d. disposing a metallic band around the overlapping portion;
   e. providing an inductor around the metallic band; and
   f. energizing the inductor to generate a magnetic field for collapsing the metallic band about the overlapping portion and magnetic pulse welding the metallic band to the metallic component, thereby securing the first and second suspension components together, wherein the metallic band is crimped over the protrusion and contacts said protrusion,
   wherein the first suspension component is an end portion forming a rotary fitting for said suspension and the second suspension component is a shaft portion for linking said rotary fitting to an additional member of said vehicle suspension.

10. The method of claim 9, wherein the protrusion is a peripheral rim on the second suspension component, said protrusion disposed outside of said first and second suspension components.

11. The method of claim 9, wherein the protrusion is integrally molded with the second suspension component.

12. The method of claim 9, wherein said first suspension component has an annular cross section circumscribing a rotary axis, and wherein the portion the first suspension component positioned with said second suspension component is a flange defining a longitudinal axis extending in a direction perpendicular to said rotary axis.

13. The method of claim 9, wherein the second suspension component includes a protrusion disposed outside and projecting away from said first and second suspension components, and wherein said metallic band is crimped over the protrusion and extends across said protrusion to contact both said flange and said second suspension component.

14. The method of claim 9, wherein the metallic band extends across said protrusion to contact both said first and said second suspension components.

* * * * *